Figure 1:
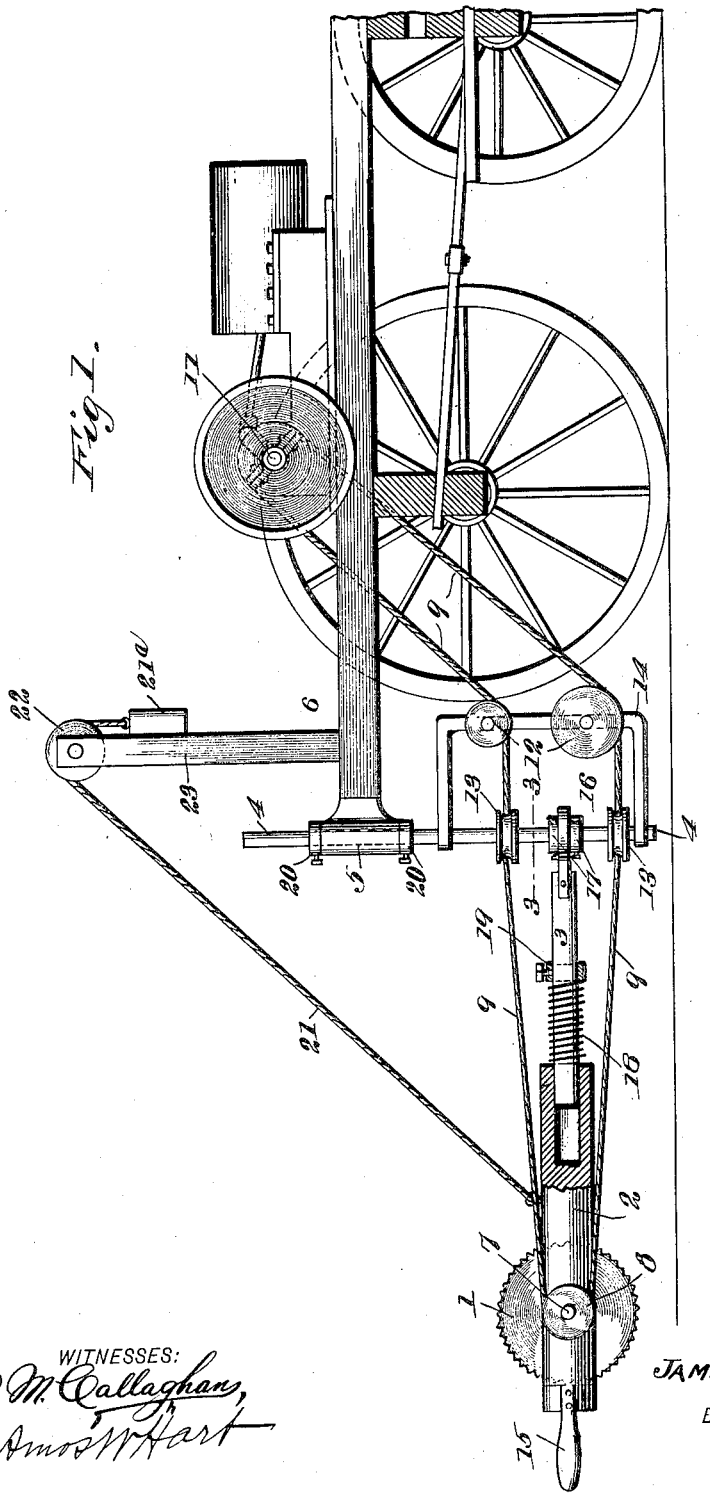

No. 827,548.

PATENTED JULY 31, 1906.

J. H. MARTIN.
ADJUSTABLE RIG FOR CIRCULAR SAWS.
APPLICATION FILED JUNE 15, 1905.

WITNESSES:

INVENTOR
JAMES H. MARTIN
BY
ATTORNEYS

No. 827,548. PATENTED JULY 31, 1906.
J. H. MARTIN.
ADJUSTABLE RIG FOR CIRCULAR SAWS.
APPLICATION FILED JUNE 15, 1905.
2 SHEETS—SHEET 2.
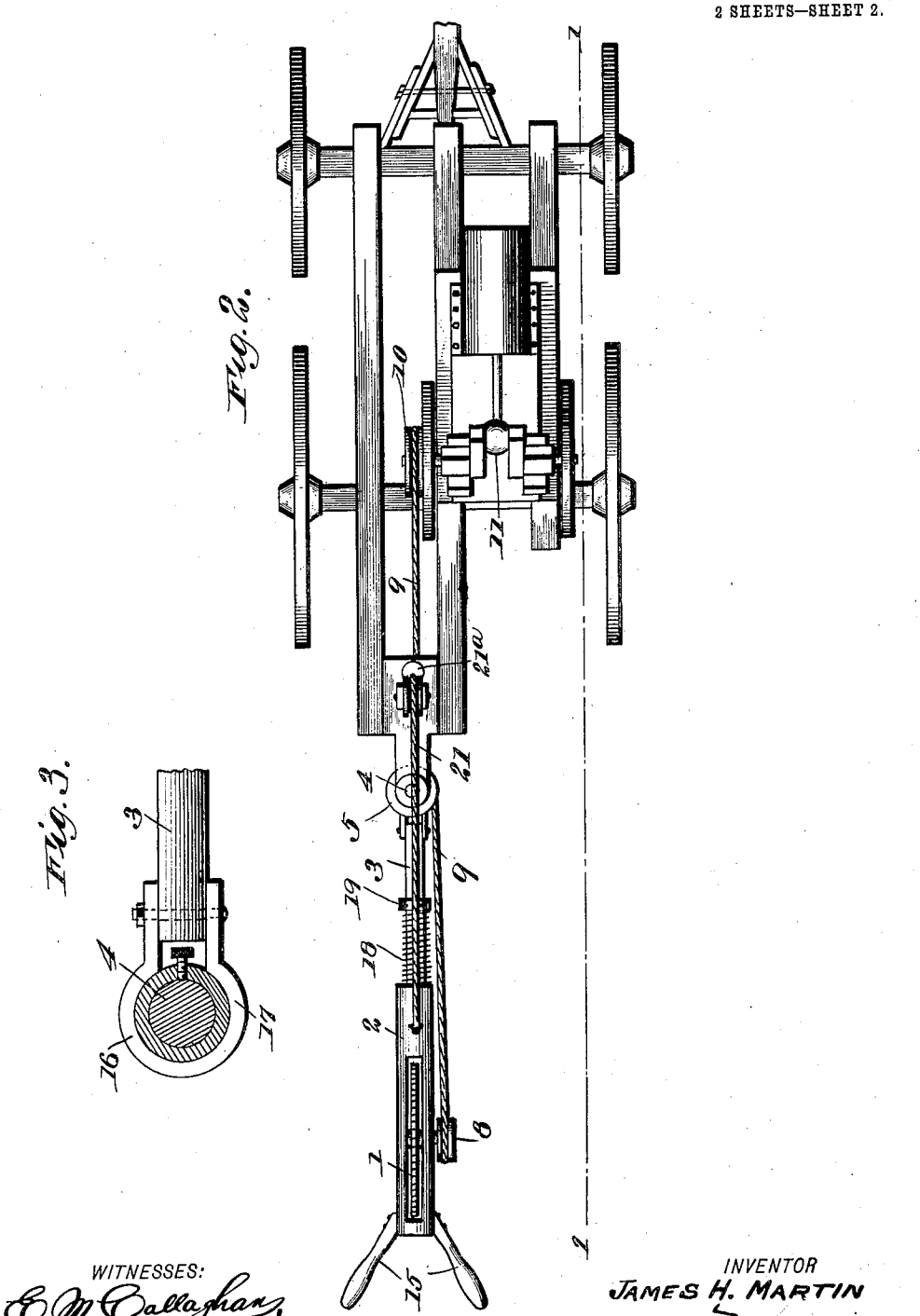
WITNESSES:
INVENTOR
JAMES H. MARTIN
BY
ATTORNEYS

UNITED STATES PATENT OFFICE.

JAMES H. MARTIN, OF SPRINGFIELD, MISSOURI, ASSIGNOR OF ONE-HALF TO LEWIS HASELTINE, OF SPRINGFIELD, MISSOURI.

ADJUSTABLE RIG FOR CIRCULAR SAWS.

No. 827,548.     Specification of Letters Patent.     Patented July 31, 1906.

Application filed June 15, 1905. Serial No. 265,425.

*To all whom it may concern:*

Be it known that I, JAMES H. MARTIN, a citizen of the United States, and a resident of Springfield, in the county of Greene and State of Missouri, have made certain new and useful Improvements in Adjustable Rigs for Circular Saws, of which the following is a specification.

My invention is an improvement in sawing-machines adapted for sawing down trees or cutting up logs and other analogous work.

It is more particularly an improvement in that class of sawing-machines in which a circular saw is supported in a swinging arm pivoted upon a wheeled frame upon which is carried means for imparting rotation to the saw.

The details of construction, arrangement, and operation of parts are as hereinafter described, and illustrated in the accompanying drawings, in which—

Figure 1 is in part a side view and in part a section of my improved sawing apparatus proper and a wagon to which it is attached. Fig. 2 is a plan view of the same part. Fig. 3 is an enlarged cross-section on the line 3 3 of Fig. 1.

The circular saw 1 is carried by an extensible bar or beam which is made of two parts 2 3, connected by a universal joint with a vertical guide 5, fixed on the end of a wagon body of frame 6.

The saw is arranged in a lengthwise slot (see Fig. 2) in the outer member 2 of the carrier, and its stub axle or journal 7 carries a grooved pulley 8, and an endless belt or rope 9 runs thereon and also on a driving-pulley 10, fixed on the crank-shaft 11 of a motor mounted on the wagon-frame 6. Intermediately of such pulleys 8 and 10 the belt or rope 9 runs on two sets of guide-pulleys which are carried in different planes—that is to say, the pulleys 12 are placed vertically one over the other on an angular arm or bracket 14, fixed on the shaft 4, projecting laterally therefrom, while the pulleys 13 are carried horizontally on the shaft 4, one above and the other below the universal joint of the saw-carrier. The outer member 2 of the saw-carrier is provided with a lengthwise socket to receive the smaller inner member 3, the two being thus slidable on each other. The saw 1 may hence be raised or lowered and moved laterally or turned to place it in different planes or at different angles, according to the work to be done. The handles 15 are a convenience in adjusting and holding the saw 1 for work. The universal joint is formed by a bushing and strap 16, the former mounted loosely and rotatably on the shaft 4 between screw-clamped collar 17 and the strap passing around the same and the saw-carrier member 3 being secured between its parallel ends, as shown in Fig. 3. To maintain the required constant tension on the belt 9 whatever may be the position of the saw, I apply a spiral spring 18 to the smaller member, its ends abutting the part 2, and an adjustable screw-clamped collar 19 on the part 3. It is obvious that by adjustment of said collar 19 the tension and pressure of the spring 18 may be changed, and thereby the tension of the belt 9, while the spring holds the belt sufficiently taut to insure rotation of the saw in any position or in any work. The shaft 4 may be adjusted higher or lower in the guide 5, it being held in any adjustment by screw-clamp collars 20, and one above and the other below said guide, as shown in Fig. 1. To counterbalance the saw and its carrier, a rope 21 is secured to the carrier member 2 and a weight 21$^a$, passing intermediately over a grooved pulley 22, journaled in the top of a vertical post 23, that is fixed on frame 6 adjacent to the shaft-guide 6.

What I claim is—

1. In a portable sawing device a movable beam carrying a circular saw for being operated perpendicularly and laterally also at any desired angle by means of a universal joint at the heel or fixed end, and a swivel-joint connecting the parts of the beam, all substantially as shown and described.

2. In a portable sawing device a beam divided into two parts one part forming a socket the other entering the same to form a swivel-joint for turning the saw in different planes; said beam having a spring provided with a nut for tightening the same for adjusting the tension of the belt substantially as shown and described.

3. In a portable sawing device a movable beam carrying a circular saw provided with handles at its outer end for the operator and a heel having a double-hinged or universal joint; one axis formed by a bolt passing through the end of the beam and a strap passing around the shaft and a bushing, permitting a perpendicular motion of the saw, and the said bushing on the shaft giving lateral motion to the saw, substantially as shown and described.

4. In a portable sawing device a beam carrying a circular saw provided with a hinged joint at its heel giving perpendicular motion and also lateral motion, combined with a swivel-joint formed in the beam for adjusting the saw in different planes, combined with a belt passing around sheaves for guiding and giving tension to the belt all substantially as shown and described.

5. In a portable sawing device the combination of a motor, a wagon-frame, and a belt with a movable beam carrying a saw; said movable beam having a universal joint at its heel for permitting the same to have perpendicular and lateral motion, and a swivel-joint in the beam for rotating the end carrying the saw to the desired plane for cutting; combined with a counterweight supported from the said wagon-frame for supporting the said beam which carries the saw all substantially as specified.

In testimony whereof I affix my signature in presence of two subscribing witnesses.

JAMES H. MARTIN.

Witnesses:
W. H. KREIDER.
J. C. STUART.